(12) United States Patent
Oechsle et al.

(10) Patent No.: US 10,042,696 B2
(45) Date of Patent: Aug. 7, 2018

(54) METHOD AND SYSTEM FOR HANDLING A DEFECTIVE ELECTRONIC USER TERMINAL

(71) Applicant: GbR Oliver Oechsle, Dr. Hans-Peter Dietz, Dusseldorf (DE)

(72) Inventors: Oliver Oechsle, Dusseldorf (DE); Hans-Peter Dietz, Muehlheim an der Ruhr (DE)

(73) Assignee: GBR OLIVER OECHSLE, DR. HANS-PETER DIETZ, Dusseldorf (DE)

( * ) Notice: Subject to any disclaimer, the term of this patent is extended or adjusted under 35 U.S.C. 154(b) by 0 days.

(21) Appl. No.: 14/910,041

(22) PCT Filed: Aug. 6, 2014

(86) PCT No.: PCT/EP2014/066905
§ 371 (c)(1),
(2) Date: Feb. 4, 2016

(87) PCT Pub. No.: WO2015/018866
PCT Pub. Date: Feb. 12, 2015

(65) Prior Publication Data
US 2016/0170826 A1     Jun. 16, 2016

(30) Foreign Application Priority Data
Aug. 8, 2013 (EP) .................................. 13179784

(51) Int. Cl.
*G06F 11/07* (2006.01)
*G06F 21/88* (2013.01)

(52) U.S. Cl.
CPC ...... *G06F 11/0793* (2013.01); *G06F 11/0721* (2013.01); *G06F 11/0796* (2013.01); *G06F 21/88* (2013.01)

(58) Field of Classification Search
USPC ............................................................ 714/3
See application file for complete search history.

(56) References Cited

U.S. PATENT DOCUMENTS

| 6,842,721 B2 | 1/2005 | Kim et al. |
| 8,646,094 B2 * | 2/2014 | Staubly ................... G06F 21/79 726/26 |

(Continued)

FOREIGN PATENT DOCUMENTS

| CN | 1158511 C | 7/2004 |
| CN | 101203893 A | 6/2008 |

(Continued)

OTHER PUBLICATIONS

International Search Report and Written Opinion for International Application No. PCT/EP2014/066905, dated Nov. 17, 2014, 8 pages.

(Continued)

*Primary Examiner* — Kamini B Patel
(74) *Attorney, Agent, or Firm* — Westman, Champlin & Koehler, P.A.

(57) ABSTRACT

The invention relates to a system for handling an at least supposedly partially defective electronic user terminal, wherein the electronic user terminal, after being successfully identified by a server, is automatically and irreversibly put into an irreparable state if a performed diagnosis of functionally relevant circuits of the user terminal indicates that said functionally relevant circuits are impaired in the functional capability thereof or have failed.

19 Claims, 3 Drawing Sheets

(56) References Cited

U.S. PATENT DOCUMENTS

| | | | |
|---|---|---|---|
| 9,488,452 B1* | 11/2016 | Daniels | F42B 5/18 |
| 2001/0027401 A1* | 10/2001 | Klein | B25J 9/08 |
| | | | 705/302 |
| 2005/0015273 A1* | 1/2005 | Iyer | G06Q 30/02 |
| | | | 705/302 |
| 2006/0125634 A1* | 6/2006 | Schreyer | G08B 13/1427 |
| | | | 340/568.1 |
| 2007/0056043 A1 | 3/2007 | Onyon et al. | |
| 2007/0106892 A1* | 5/2007 | Engberg | G06Q 20/02 |
| | | | 713/168 |
| 2008/0224879 A1* | 9/2008 | Zadesky | G01P 15/06 |
| | | | 340/653 |
| 2009/0009283 A1* | 1/2009 | Arts | G08B 13/1418 |
| | | | 340/5.2 |
| 2009/0241172 A1* | 9/2009 | Sennett | G06F 21/88 |
| | | | 726/4 |
| 2012/0151121 A1* | 6/2012 | Braga | G06F 21/79 |
| | | | 711/103 |
| 2013/0198574 A1* | 8/2013 | Higley | G06F 11/0727 |
| | | | 714/45 |
| 2014/0162598 A1* | 6/2014 | Villa-Real | H04M 1/66 |
| | | | 455/411 |
| 2014/0263216 A1* | 9/2014 | Clark | B23B 41/00 |
| | | | 219/121.71 |
| 2014/0267691 A1* | 9/2014 | Humphrey | G06T 7/001 |
| | | | 348/125 |

FOREIGN PATENT DOCUMENTS

| | | |
|---|---|---|
| DE | 34 39 563 A1 | 4/1986 |
| WO | 92/03787 A1 | 3/1992 |
| WO | 01/03100 A1 | 1/2001 |
| WO | 2013/083940 A1 | 6/2013 |

OTHER PUBLICATIONS

First Office Action from Chinese Patent Application No. 201480045115.0, dated Jan. 2, 2018, 7 pages.

* cited by examiner

METHOD AND SYSTEM FOR HANDLING A DEFECTIVE ELECTRONIC USER TERMINAL

CROSS-REFERENCE TO RELATED APPLICATION

This Application is a Section 371 National Stage Application of International Application No. PCT/EP2014/066905, filed 6 Aug. 2014 and published as WO 2015/018866/ on 12 Feb. 2015, in German, the contents of which are hereby incorporated by reference in their entirety.

The invention relates to a method and a system for handling or identifying an at least supposedly partially defective electronic user terminal, e.g. a digital camera, an MP3 player or a smartphone.

Device manufacturers of electronic products, in particular of electronic user terminals, e.g. digital cameras, MP3 players, games consoles or smartphones, guarantee to their customers that the devices produced by them function without any problems or that the functionality thereof is in no way impaired. If errors occur on such an electronic user terminal, then the device manufacturer is obligated to replace the defective device with a new device or to remedy the technical defects which have occurred, so long as the errors which have occurred cannot be attributed to erroneous handling on the part of the customer. Erroneous handling on the part of the user can be a result, for example, of the user dropping the device or of the device being exposed to moisture.

Conventional devices, in particular electronic user terminals, have, in many cases, integrated circuits which are mounted on circuit boards. If a functionality provided by an integrated circuit on a circuit board fails, often the cost of repairing the circuit or circuit board is higher than the total costs of producing the terminal. Owing to the high complexity of the electronic user terminals, technical errors can only be found with a great deal of effort. If an error is determined on the basis of a malfunction e.g. in an integrated circuit, then in many cases it is necessary to replace the entire circuit board.

If it is no longer cost-effective to repair an electronic device which is at least partially impaired in terms of its functionality, then the defective device is replaced by the device manufacturer or device retailer with a faultless device. To prevent misuse by a user, a warranty check takes place beforehand. Initially, a check is made as to whether a warranty claim of the user actually exists. This takes place e.g. using a customer receipt and the warranty regulations underlying the purchase. Furthermore, a check can be made as to whether the warranty claim still falls within the period of warranty of the respective device. In a further step, a check is made as to whether the warranty should be excluded, for example owing to erroneous operation by the user, owing to undue force being exerted on the electronic device by the user, or by any other prohibited manipulation of the device by the user.

In order to prevent misuse, it is thus necessary for the device retailer to physically accept delivery of the defective electronic user terminal. Then, the device retailer or the device manufacturer itself performs a check of the defect which has occurred. If the electronic user terminal is actually defective, it is disposed of by the device manufacturer, with parts of the terminal being recycled if possible. Then, the user receives a replacement device from the device manufacturer. The conventional process requires a logistics chain from the manufacturer of the device to the customer and a further logistics chain from the customer to the manufacturer of the device or a service provider, authorised by the manufacturer, for the warranty management. The cost of handling defective electronic user terminals is considerable owing to the required logistics chain and the IT monitoring systems associated therewith. Furthermore, the conventional process is disadvantageous in that the time until the user receives a user terminal, which functions without any problems, as a replacement device for a defective electronic user terminal, is often relatively long and can be a few weeks. Within this time frame, the user cannot use the corresponding electronic user terminal but instead must wait for the replacement device.

It is thus the object of the present invention to provide a method and a system for handling defective electronic user terminals, which method/system obviates the disadvantages mentioned above and in particular reduces the cost for the manufacturer of the user terminal and/or the device retailer thereof when handling defective electronic user terminals.

This object is achieved in accordance with the invention by means of a system having the features stated in claim 1.

The invention thus provides a system for handling an at least partially defective electronic user terminal, wherein the electronic user terminal, after being successfully identified by a server, is automatically and irreversibly put into an irreparable state, in particular a state which cannot be repaired in an economically expedient manner, if a performed diagnosis of functionally-relevant circuits of the user terminal indicates that these functionally-relevant circuits are impaired in terms of their functionality or have failed.

The user terminal is put into an irreparable state, in particular when the effort or costs of repair are greater than or equal to the value of the repaired user terminal.

In one possible embodiment of the system in accordance with the invention, the server is a server of a device manufacturer of the respective defective electronic user terminal.

In a further possible embodiment of the system in accordance with the invention, the server is a server of the device retailer of the affected defective electronic user terminal.

In a further possible embodiment of the system in accordance with the invention, the server of the device manufacturer or device retailer is connected to the user terminal via an interface of the user terminal.

This interface can be a wired or wireless interface.

In a further possible embodiment of the system in accordance with the invention, the electronic user terminal also has, in addition to the functionally-relevant circuits, at least one security-relevant circuit.

In one possible embodiment of the system in accordance with the invention, the security-relevant circuit of the electronic user terminal transmits a unique identifier of the user terminal for the identification thereof at the server, even if a power supply of the electronic user terminal or functionally-relevant circuits of the user terminal have failed.

In a further possible embodiment of the system in accordance with the invention, the unique identifier of the user terminal is a device code stored in a memory of the user terminal.

In one possible embodiment of the system in accordance with the invention, the device code stored in the memory of the user terminal is derived from a serial number of the user terminal.

In a further possible embodiment of the system in accordance with the invention, the electronic user terminal is automatically put into the irreparable state only after the user has transmitted a confirmation in this regard to the server.

In a further possible embodiment of the system in accordance with the invention, the server, after receiving confirmation to put the user terminal into the irreparable state, causes the security-relevant circuit of the user terminal to perform an irreversible manipulation of at least one component of the user terminal which irreversibly puts the user terminal into the irreparable state.

In a further possible embodiment of the system in accordance with the invention, the irreversible manipulation includes the destruction of an electronic component, in particular a fuse within the user terminal.

In a further possible embodiment of the system in accordance with the invention, the irreversible manipulation includes the overwriting of stored configuration data of the user terminal.

In a further possible embodiment of the system in accordance with the invention, with respect to the at least partially defective user terminal, after establishing a connection between the affected user terminal and the server, a dataset is transmitted to the server for performing data synchronisation in relation to the presence of a warranty.

In one possible embodiment of the system in accordance with the invention, the dataset transmitted to the server comprises:
user-specific data of the user,
device-specific data of the user terminal, in particular the unique identifier of the user terminal,
error-specific data indicating the technical malfunctions which have occurred on the user terminal and the circumstances surrounding the malfunctions, and
sales-specific data indicating a purchasing process when the user bought the user terminal from a device retailer or the device manufacturer.

In a further possible embodiment of the system in accordance with the invention, sensors provided on the user terminal provide sensor data to the server indicating external impacts which have occurred on the user terminal, in particular undue mechanical force and ingress of moisture.

In a further possible embodiment of the system in accordance with the invention, the error-specific data contained in the dataset and the sensor data obtained by the sensors on the user terminal are evaluated by the server in order to establish whether these items of data are compatible with each other.

In a further possible embodiment of the system in accordance with the invention, the functionally-relevant circuits within the user terminal are diagnosed by the server in relation to their functionality.

In a further possible embodiment of the system in accordance with the invention, the functionally-relevant circuits within the user terminal are diagnosed by the security-relevant circuit of the user terminal in relation to their functionality.

In a further possible embodiment of the system in accordance with the invention, the functionally-relevant circuits of the user terminal are diagnosed interactively with the user in that the user performs particular actions, on request, on the user terminal.

In a further possible embodiment of the system in accordance with the invention, the security-relevant circuit is integrated in the user terminal itself.

In a further possible embodiment of the system in accordance with the invention, the security-relevant circuit is integrated in a component connected to the user terminal.

In one possible embodiment of the system in accordance with the invention, the component connected to the user terminal is a mains plug, an adapter or a connecting cable.

In a further possible embodiment of the system in accordance with the invention, the user manually actuates at least one button provided on the user terminal in order to confirm putting the user terminal into the irreparable state.

In a further possible embodiment of the system in accordance with the invention, the electronic user terminal is a portable user terminal which is connected to a computer via an interface, which computer is connected to the server via a network, in particular a data or telephone network.

In a further possible embodiment of the system in accordance with the invention, the security-relevant circuit of the user terminal, after the user terminal has been put into the irreparable state, transmits a corresponding acknowledgement to the server.

In a further possible embodiment of the system in accordance with the invention, the server, after receipt of the acknowledgement, initiates the dispatching of a replacement user terminal to the user to replace the user terminal put into the irreparable state.

The invention further provides a method having the features stated in claim 19.

The invention thus provides a method for handling an at least partially defective electronic user terminal, wherein the electronic user terminal, after being successfully identified by a server, is automatically and irreversibly put into an irreparable state, if a performed diagnosis of functionally-relevant circuits of the user terminal indicates that these functionally-relevant circuits are impaired in terms of their functionality or have failed.

The invention further provides an electronic user terminal having the features stated in claim 18.

The invention further provides a server for handling an at least partially defective electronic user terminal having the features stated in claim 19.

Furthermore, possible embodiments of the method in accordance with the invention and of the system in accordance with the invention for handling an at least partially defective electronic user terminal are explained in more detail with reference to the accompanying figures.

Figure 1:
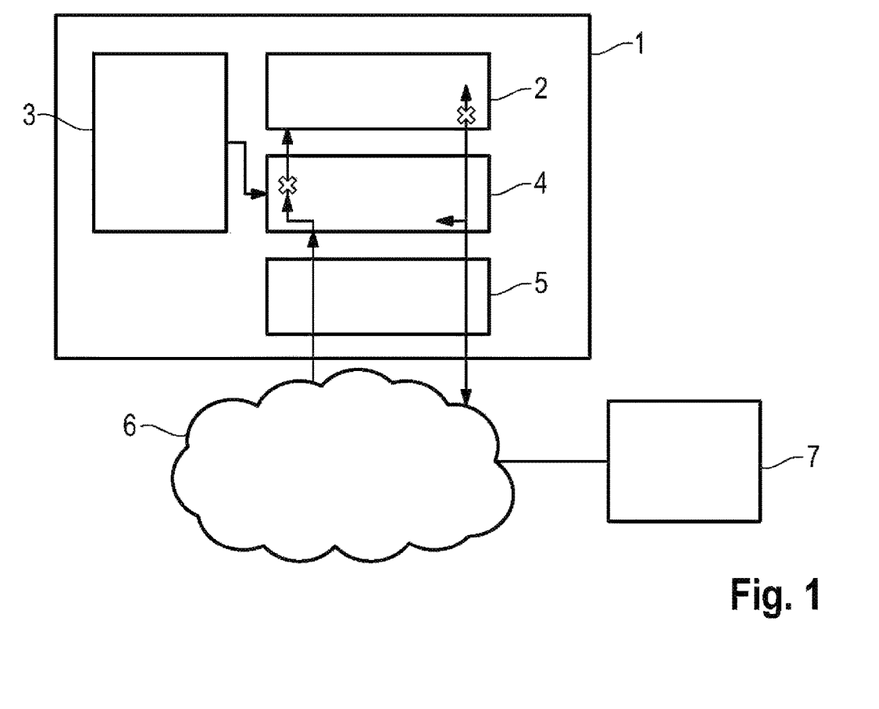
FIG. 1 shows a block diagram for illustrating an exemplified embodiment of an electronic user terminal in accordance with the invention, as can be used in the system and method in accordance with the invention.

FIG. 1 shows, by way of example, an embodiment of an electronic user terminal 1 in accordance with the invention, as can be used in the system and method in accordance with the invention. The electronic user terminal 1 is, for example, a digital camera or a computer games console. Further examples of electronic user terminals 1 include smartphones, portable computers or MP3 players. Furthermore, the user terminal 1 can be a television set or a component of a stereo system, for example. In the exemplified embodiment illustrated in FIG. 1, the electronic user terminal 1 includes functionally-relevant circuits 2 which provide technical functions of the respective user terminal 1. Functionally-relevant circuits 2 are, for example, circuit boards or other electronic components of the user terminal 1. The user terminal 1 can contain a multiplicity of different functionally-relevant circuits 2. The functionally-relevant circuits 2 of the user terminal 1 are supplied with energy by a power supply unit 3.

In the exemplified embodiment illustrated in FIG. 1, the user terminal 1 also contains, in addition to the functionally-relevant circuits 2, at least one security-relevant circuit 4. In the exemplified embodiment illustrated in FIG. 1, the security-relevant circuit 4 is provided between an interface 5 of the user terminal 1 and the functionally-relevant circuits 2. The interface 5 is, for example, a USB or HMI interface. In one possible embodiment, the interface 5 is a wired interface. In a further possible embodiment, the interface 5 is a wireless radio interface. The user terminal 1 has one or more similar or different interfaces 5. As can be seen in FIG. 1, the user terminal 1 can be connected to a network 6. This network 6 is, for example, a data network, in particular the Internet. A data network 6 can also be a local network LAN. Furthermore, in one possible embodiment, the network 6 can be a telephone network. In a further possible embodiment of the user terminal 1 in accordance with the invention, the power is likewise supplied to the functionally-relevant circuits 2 within the user terminal 1 via the interface 5 or via a USB interface. In one possible embodiment, the electronic user terminal 1 contains, in addition to the functionally-relevant circuits 2 required for it to function, one or more security-relevant circuits 4 in a separate region. This region can be supplied with the necessary operating voltage by the power supply 3 internal to the device and also via the external interface 5 or a charging adapter. The user terminal 1 can establish a data connection to a server 7 via the network 6, as illustrated in FIG. 1. The server 7 can be the server of the device manufacturer of the respective user terminal 1. Furthermore, the server 7 can be the server of a device retailer who has sold the user terminal 1 to the user. Furthermore, in a further possible embodiment of the system in accordance with the invention, the server 7 can be the server of a service provider who has been instructed by the device retailer or the device manufacturer to perform a warranty process.

The system in accordance with the invention for handling an at least partially defective electronic user terminal 1 comprises at least one server 7 which is, for example, the server of the device manufacturer. The server 7 can be connected to the user terminal 1 via the interface 5 of the user terminal 1. If the user terminal 1 is at least partially defective, initially a data connection is established directly or indirectly between the user terminal 1 and the server 7. Then, the electronic user terminal 1 identifies itself to the server 7. Identification can take place by way of the security-relevant circuit 4. After successful identification of the user terminal 1 to the server 7, the functionally-relevant circuits 2 of the user terminal 1 are diagnosed. If this diagnosis of the functionally-relevant circuits 2 of the user terminal 1 indicates that these functionally-relevant circuits 2 are impaired in terms of their functionality or have completely failed, the server 7 automatically causes the user terminal 1 to be put into an irreparable state. To do this, the server 7 can send a control command to the security-relevant circuit 4. The irreparable state is irreversible. Preferably, the user terminal 1 is put into the irreversible irreparable state only after the electronic user terminal 1 has successfully identified itself to the server 7 and the subsequent diagnosis of the functionally-relevant circuits 2 has shown that at least one of the functionally-relevant circuits 2 is impaired in terms of its functionality or has even completely failed and it is not economically expedient to repair it.

In one possible embodiment, the electronic user terminal 1 is automatically put into the irreparable state only after the user has transmitted a confirmation in this regard to the server 7. By way of this confirmation, the user is confirming that he is in agreement with the irreversible manipulation of his user terminal 1. Prior to manipulating the terminal, the manufacturer can send the user the confirmation of the professional examination of the warranty claims, e.g. by e-mail.

As shown in FIG. 1, the electronic user terminal 1 additionally comprises the at least one security-relevant circuit 4 in the functionally-relevant circuits, said security-relevant circuit, in one possible embodiment, automatically transmitting a unique identifier of the user terminal 1 to a server 7 for identification thereof. The unique identifier of the user terminal 1 is transmitted by the security-relevant circuit 4 preferably even if a power supply to the electronic user terminal 1 and its functionally-relevant circuits 2 has failed. In this embodiment, the security-relevant circuit 4 is preferably supplied with power via the external interface 5 or a separate battery so that it is always able to transmit the unique identifier of the user terminal 1 to the server 7 via the interface 5. In one possible embodiment, this unique identifier of the user terminal 1 is stored in a memory of the user terminal 1, the security-relevant circuit 4 having access to said memory. In one possible embodiment, this unique identifier is a device code GC which may be derived from a serial number SN of the user terminal 1. The device code GC is transmitted by the security-relevant circuit 4 via the interface 5 and the network 6 to the server 7 for identification of the user terminal 1 at the server 7 and is examined at the server. After successful identification of the user terminal 1 by the server 7, e.g. by the server of the device manufacturer, the functionally-relevant circuits 2 of the user terminal 1 are diagnosed. In one possible embodiment, the functionally-relevant circuits 2 within the user terminal 1 are diagnosed in relation to their functionality by the remote server 7 via the network 6. In an alternative embodiment of the system in accordance with the invention, the functionally-relevant circuits 2 within the user terminal 1 are diagnosed in relation to their functionality by the security-relevant circuit 4 within the user terminal 1.

In one possible embodiment, the functionally-relevant circuits 4 of the user terminal 1 can be diagnosed interactively in that the user performs particular actions, on request, on the user terminal 1.

For example, the user can be requested by the remote server 7 or by a routine performed in the security-relevant circuit 4 to perform actions, which are relevant to the type of error, on the user terminal 1, e.g. to press the associated shutter release if a camera on the user terminal 1 has failed. Furthermore, the user can be requested, for example, to make a noise or the like if there is a defect in a microphone on the user terminal 1.

As soon as the server 7 has received confirmation, from the user, to put his user terminal 1 into the irreparable state, an irreversible manipulation of at least one component of the user terminal 1 is performed, and therefore the user terminal 1 is ultimately rendered unusable for the user. The irreversible manipulation consists, for example, of the destruction of an electronic component, e.g. an electronic fuse provided in a circuit. The security-relevant circuit 4 can draw the energy required to destroy the electronic fuse from the outside e.g. via the interface 5.

Furthermore, in an alternative embodiment, it is possible to irreversibly overwrite stored configuration data in a configuration data memory of the user terminal 1. Technical changes which put the user terminal 1 into the irreparable state can relate to one or more measures in the user terminal 1. Preferably, safety fuses can be burnt out at one or more places in the user terminal 1, which fuses isolate or shut down functional regions of the user terminal or functionally-relevant circuits 2, wherein the functional regions cannot then be replaced by simple measures. The provided safety fuses can be integrated, for example, in individual circuits or chips. Furthermore, it is possible to completely destroy certain circuits or render them unusable by reversing the voltage for said circuits.

In a further possible embodiment of the system in accordance with the invention, with respect to the at least partially defective user terminal 1, also with a connection between the affected user terminal 1 and the server 7, a dataset is transmitted from the user terminal to the server 7 for performing data synchronisation in relation to the possible presence of a warranty. In one possible embodiment, this dataset transmitted from the user terminal 1 to the server 7 comprises user-specific data of the user, e.g. his name, address or customer number. Furthermore, the dataset transmitted for data synchronisation can include device-specific data of the user terminal, in particular the unique identifier or the device code GC, of the user terminal 1. Furthermore, the transmitted dataset can contain error-specific data. The error-specific data contain details regarding the technical malfunctions which have occurred on the user terminal 1 and the circumstances surrounding the malfunctions. In one possible embodiment, these error-specific data can be input by the user via a user interface of the user terminal 1, e.g. a keypad, and transmitted to the server 7. In a further possible embodiment, the user terminal 1 can also be connected to a local processor, e.g. a computer, via its interface 5, said computer having a corresponding keyboard or user interface. In this manner, it is possible for the user to describe, e.g. in the form of text, the error which has occurred or the disturbance which has occurred on the user terminal 1. Furthermore, the user can provide details regarding the circumstances surrounding the malfunctions. For example, the user can explain that the device has accidentally fallen onto the floor. In a further possible embodiment of the system in accordance with the invention, the dataset transmitted for data synchronisation comprises sales-specific data indicating a purchasing process. These sales-specific data contain data relating to when the user bought the user terminal 1 from a device retailer or the device manufacturer. These data include, for example, a sales receipt or a credit card transaction number.

In a further possible embodiment of the system in accordance with the invention, the user terminal 1 has sensors additionally integrated therein or connectable thereto. In one possible embodiment, these sensors provide sensor data to the server 7. For example, the sensors can detect external impacts which have occurred on the user terminal 1, in particular undue mechanical force and ingress of moisture and provide the corresponding sensor data to the server 7. Possible jolts due to being dropped or ingress of water can thereby be determined on the user terminal 1 using the received sensor data 7. The data can result can possibly result in an exclusion of the warranty claims or can imply that the defective device 1 is not replaced with a functional user terminal 1 by the device manufacturer.

In a further possible embodiment of the system in accordance with the invention, the error-specific data contained in a dataset and the sensor data obtained by the sensors on the user terminal can be evaluated by the server 7 and compared with each other in order to establish whether these items of data are compatible with each other. If the user indicates that no specific circumstances surrounding the malfunctions have occurred and the sensor data simultaneously lead to the conclusion that the affected user terminal 1 has been damaged owing to considerable undue force, the device manufacturer may not readily believe the statements by the user and a more detailed examination of the user terminal 1 is required.

In the exemplified embodiment illustrated in FIG. 1, the security-relevant circuit 4 is located within the user terminal 1. In an alternative embodiment of the system in accordance with the invention, the security-relevant circuit can be located completely or partially in a component connected to the user terminal 1. In this embodiment, the security-relevant circuit 4 is located, for example, in a mains plug of the user terminal 1, in an adapter of the user terminal 1 or in a connecting cable. For example, the security-relevant circuit 4 is located in a USB adapter.

One or more sensors can be provided in the security-relevant circuit 4 in order to detect undue force or the ingress of moisture on the user terminal 1. The security-relevant circuit 4 thus fulfils different functions, namely uniquely identifying the user terminal 1 at the server 7 using the device code GC, and determining—using sensors—possible instances of undue force, shock, ingress of water within the housing or the like. Furthermore, the security-relevant circuit 4 examines, by querying, the functionality of components or assemblies in terms of their functionality within the functionally-relevant circuits 2. By using the additional security-relevant circuit 4, the user terminal 1 is able to communicate even if the functionally-relevant regions or functionally-relevant circuits 2 or power supply 3 have failed. If, for example, the user terminal 1 is connected to a PC using a USB port or a WLAN interface or Bluetooth interface or via a charging device, the user terminal 1 can communicate with the data processing platform of the device manufacturer via the connected PC. In one possible embodiment, the functionally-relevant circuits 2 are diagnosed by the security-relevant circuit 4. In an alternative embodiment, the functionally-relevant circuits are diagnosed after the server 7 has established a connection. In a further possible embodiment, a two-stage diagnosis is performed by the security-relevant circuit 4 and then by the remote server 7. In one possible embodiment, the diagnosis results from this two-stage diagnosis are compared with each other. The reliability in determining the error which has occurred can hereby be increased.

In a further possible embodiment of the system in accordance with the invention, the security-relevant circuit 4 of the user terminal 1, after the user terminal 1 has been put into the irreparable state, transmits a corresponding acknowledgement to the server 7. Then, after receipt of the acknowledgement, the server 7 can initiate the dispatching of a replacement user terminal to the user to replace the user terminal 1 put into the irreparable state. In one possible embodiment, the replacement user terminal can be sent by the device manufacturer directly to the address of the user, said address being contained in the user-specific data of the dataset. Alternatively, the user can also obtain, electronically, a confirmation by the server 7 of the device manufacturer which allows him to obtain a corresponding replacement user terminal from a device retailer located close by. In one possible embodiment of the system in accordance with the invention, a error which has occurred is diagnosed and analysed by a software routine performed by the security-relevant circuit 4 and/or by the server 7 of the device manufacturer. If diagnosis and analysis of a defect occurs and a warranty claim from the user actually exists, on the basis of the dataset, then in one possible embodiment the security-relevant circuit 4 and/or the server 7 can attempt to fix the error which has occurred by finding a software patch or a version of a software update. In this embodiment, the defective user terminal 1 is irreversibly changed only after a corresponding attempt at repair by the security-relevant circuit 4 and/or the server 7 has failed. In this case, in one possible embodiment, the user is initially asked whether he is in agreement with proceeding further, namely with putting his user terminal into the irreparable, completely destroyed state and with obtaining a replacement device, if possible a similar device to meet the existing warranty claim. Furthermore, the user may be obliged to dispose of or recycle the affected device 1 according to national laws or guidelines. In one possible embodiment, after confirmation from the user to continue this process, the server 7 initiates a routine which produces an irreversible manipulation in the user terminal 1 which ultimately renders the user terminal 1 unusable. In one possible embodiment, this confirmation from the user can be effected via a button query or number input on the user terminal 1 itself or a device connected to the user terminal 1, e.g. a PC. The button query offers the advantage that a manual function which is difficult to emulate is required for the destruction of the user terminal 1 which cannot be abused by third parties by viruses or other harmful software in order to destroy the devices of the manufacturer and thus harms the manufacturer.

Figure 2:
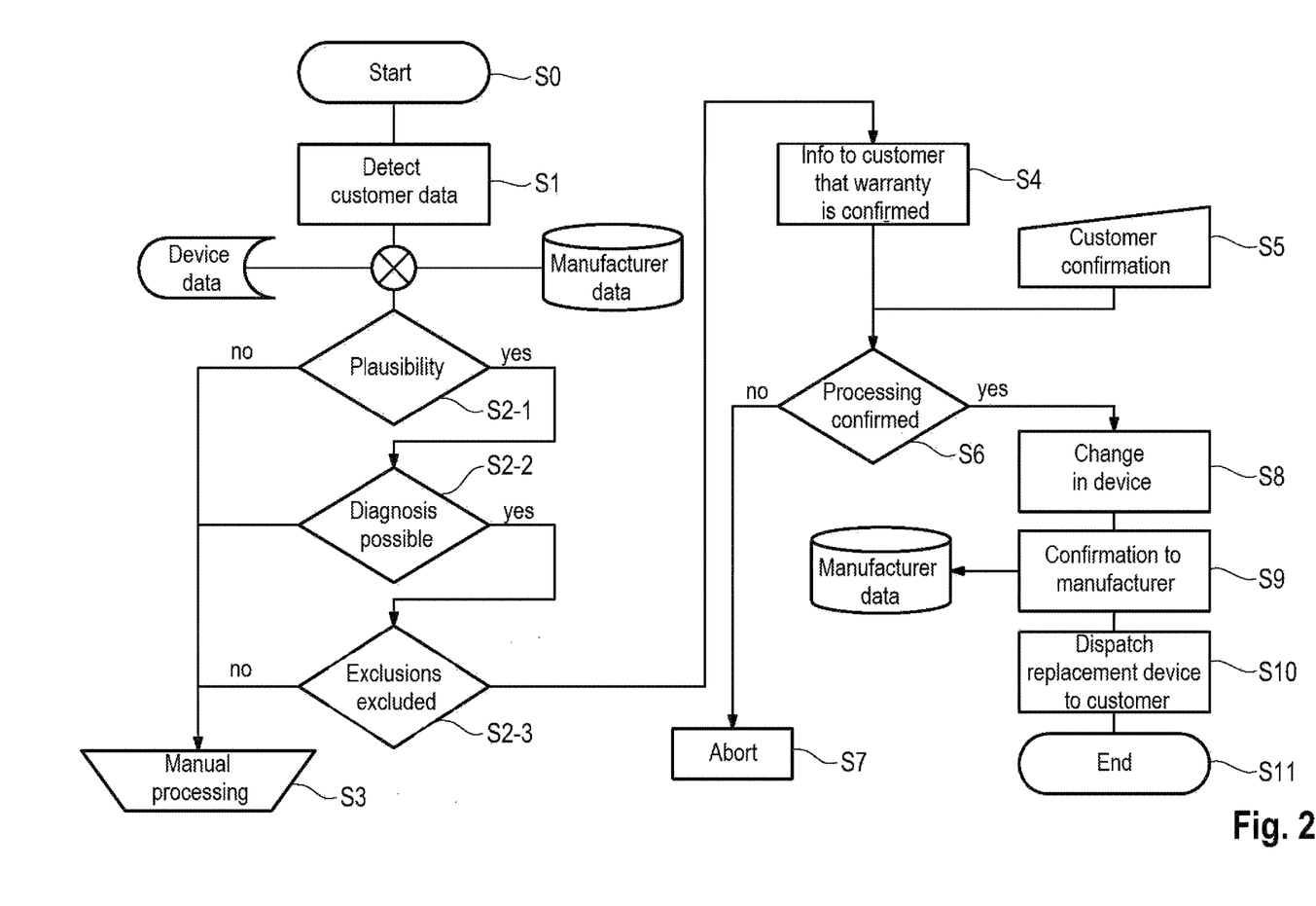
FIG. 2 shows a flow diagram for illustrating an exemplified embodiment of the method in accordance with the invention for handling an at least partially defective electronic user terminal.

FIG. 2 shows a flow diagram for illustrating an exemplified embodiment of the method in accordance with the invention for handling an at least partially defective electronic user terminal 1. Firstly, after a starting step S0, the user data of the user is detected in a step S1. The user-specific data can be transmitted in a dataset with device-specific data of the user terminal 1 and error-specific data and sales-specific data to the server 7 of the device manufacturer or device retailer. Identification or authentication can initially occur using the device-specific data of the user terminal 1, in particular the unique identifier or the device code GC of the user terminal 1. Then, in a step S2-1, the transmitted data is checked for plausibility. For example, a check is made as to whether the transmitted serial number SN of the device 1 coincides with the described device type. Furthermore, for example, a check can be made as to whether the serial number SN or the device code GC belongs to a device 1 which has actually been supplied in the respective country, region or sales territory. Furthermore, for example, the sales-specific data can be used to examine whether a corresponding sales receipt has actually been generated. To this end, in one possible embodiment, the server 7 accesses a database in which the corresponding data has been placed by the device manufacturers. Furthermore, it is possible that the server 7 makes a corresponding request to the server of the device retailer.

Furthermore, in step S2-1, for example, the user-specific data can be used to check whether or not a device has already been dispatched to the address of the user as part of a warranty. Furthermore, for the sake of security, a check can be made as to whether or not the provided serial number SN has already been registered in a warranty. In addition, in a further step, a check is made as to whether or not the description of the error by the customer in relation to the technical disruptions which have occurred is compatible with the diagnosis result and/or the transmitted sensor data.

Prior to performing the diagnosis, a check can be made in a possible step S2-2 as to whether a diagnosis is actually possible on the user terminal 1 for the error which has occurred. Furthermore, in a further step S2-3, a check can be made as to whether warranty claims are excluded. If a negative result is produced in steps S2-1, S2-2, S2-3, then the defect which has occurred can be treated in the conventional manner on the user terminal 1 in step S3. If the plausibility check S2-1 is successful, then the error which has occurred can be diagnosed in step S2-2. If it is established in step S2-3 that the warranty claims are not excluded, then in the exemplified embodiment illustrated in FIG. 2, a corresponding message is sent in step S4 from the server 7 to the user of the terminal 1 and, if appropriate, the presence of a warranty claim is confirmed. Then, the user can be requested in step S5 to confirm that he is in agreement with continuing the routine, i.e. putting his device into an irreparable state. After inputting such a customer confirmation, e.g. by pressing a button on the user terminal 1 or by a corresponding input on a computer connected to the user terminal 1 in step S5, in step S6 the server 7 checks whether or not the customer has confirmed that he is in agreement with continuing the process. If the user has stated that he is not in agreement with continuing the process, then the process can be aborted in a step S7 and optionally switches over to the conventional process. If the user is in agreement with the further processing of the warranty, then in a step S8 the user terminal 1 is irreversibly put into an irreparable state. This is entered into a database of the device manufacturer, e.g. by way of a corresponding confirmation, in a step S9. In a further step S10, the server 7 then initiates the dispatching of a replacement device to the user of the defective terminal 1. The process ends in step S11, as illustrated in FIG. 2.

Figure 3:
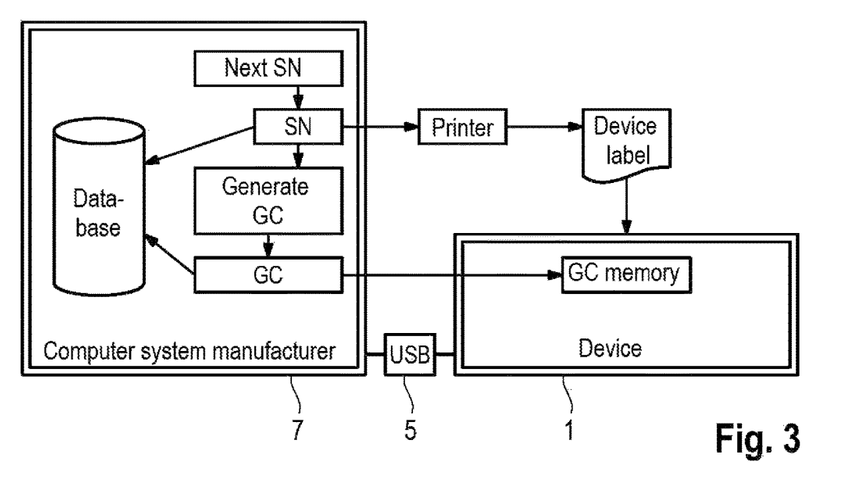
FIG. 3 shows a block diagram for illustrating a device preparation, as can take place in the system and method in accordance with the invention.

FIG. 3 shows a block diagram for illustrating a device preparation of a user terminal 1, as can be used by the system and method in accordance with the invention. In a possibly last production step when manufacturing the user terminal 1, the computer system or the server 7 of the device manufacturer generates a device code GC and transmits the generated device code GC to a non-volatile device code memory via an interface 5 of the user terminal 1, as illustrated in FIG. 3. For example, computer system manufacturers can generate a device code GC whilst the label is printed with a serial number SN of the user terminal 1 and is attached to the housing of the device 1. The serial number SN is printed on a device label using a printer and is attached to the housing of the user terminal 1, as illustrated in FIG. 3. Furthermore, in the exemplified embodiment illustrated in FIG. 3, the associated device code GC can be automatically generated from the serial number SN. In one possible embodiment, the device code GC is generated on the basis of the serial number SN of an encryption or mapping algorithm. In one possible embodiment, the generated device code GC is extremely long for security reasons and has, for example, 64 bits. The device code GC provides a unique system-internal identification of the user terminal 1 produced by the device manufacturer. Each serial number SN has a unique device code GC allocated thereto. The provided serial numbers SN and device codes GC are stored, as illustrated in FIG. 3, in a database of the computer system of the device manufacturer.

Figure 4:
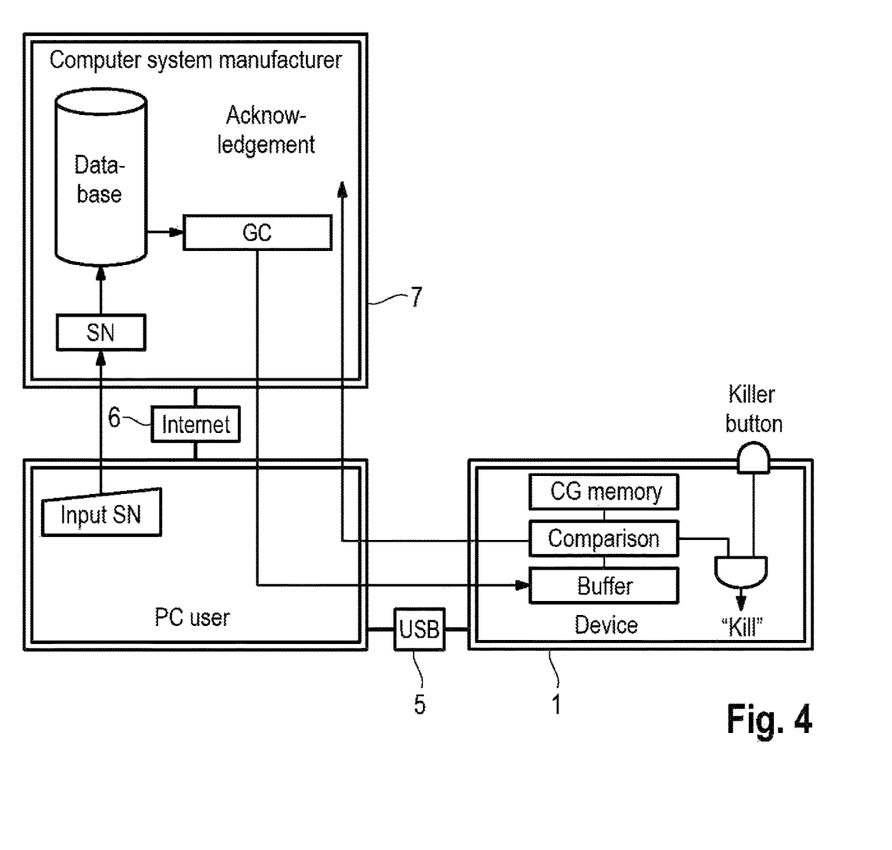
FIG. 4 shows a block diagram for explaining the mode of operation of the method and system in accordance with the invention for handling an at least partially defective electronic user terminal according to the invention.

FIG. 4 illustrates an exemplified embodiment of the method in accordance with the invention and of the system in accordance with the invention for handling an at least partially defective electronic user terminal 1. If a malfunction occurs on the user terminal 1, then in the illustrated exemplified embodiment, the user can connect the user terminal 1 to his PC via the interface 5 of the user terminal 1, e.g. a USB interface. Then, the user inputs the serial number SN of the user terminal 1 into the PC, said serial number being read for example from the device label on the housing of the device 1. In an alternative embodiment, the serial number SN can also be stored in a memory and read out from the user terminal 1. The serial number SN is transmitted to the server 7 of the device manufacturer via the data network, e.g. the Internet. The server 7 of the device manufacturer has access to a database and can extract the device code GC allocated to the serial number SN and transmit same, optionally in an encrypted manner, via the data network or the Internet to the PC of the user and the interface 5 of the user terminal 1 in a buffer within the user terminal 1. The data content of the buffer having the device code GC obtained from the server 7 is compared with the device code GC which is located in the device code memory of the user terminal 1. This can occur, for example, using a comparator or the like. The result of the comparison is transmitted from the user terminal 1 back to the server 7 of the computer manufacturer via the PC and the network. In the case of correspondence and corresponding acknowledgement, the system server of the device manufacturer is informed that the affected device 1 is an original device of the device manufacturer. In one possible embodiment, after this successful identification of the user terminal 1 as an original device, the routine illustrated in FIG. 2 is executed for treating the error. In step S5, the user can press, for example, a corresponding confirmation button provided on the user terminal 1 to enable the process of putting the user terminal into the irreparable state in step S8. The corresponding button or button combination can have, within the scope of regular functioning, an alternative function and can only be reprogrammed within the scope of the process described above.

As can be seen in FIGS. 3 and 4, the data is transmitted between the server 7 of the device manufacturer and the user terminal in a manner which is manipulation-proof to the greatest possible extent. The advantage of the process in accordance with the invention is that the user does not have to visit the device retailer if a malfunction occurs on his device 1, but rather can contact the device manufacturer directly. The processing of the warranty claim by the device manufacturer is hereby considerably accelerated, and therefore the user can obtain the replacement device from the device manufacturer in a relatively short amount of time, so long as his warranty claims have been verified. Furthermore, the logistics costs for the manufacturer of the device 1 for carrying out the warranty routine are low because the communication between the user terminal 1 or the user and the device manufacturer can occur via a data network, e.g. via the Internet and can be performed automatically to the greatest possible extent. The system and method in accordance with the invention are suitable for any electronic user terminals, primarily for electronic consumer products.

The invention claimed is:

1. A system for handling an at least supposedly partially defective electronic user terminal comprising functionally-relevant circuits and at least one security-relevant circuit located within or connected to the electronic user terminal, wherein the security-relevant circuit is electronically connected to the electronic user terminal, wherein the electronic user terminal, after being successfully identified by a server, is automatically and irreversibly put into an irreparable state by way of an irreversible manipulation of at least one component of the user terminal, if a performed diagnosis of the functionally-relevant circuits of the user terminal indicates that these functionally-relevant circuits are impaired in terms of their functionality or have failed, the electronic user terminal establishes directly or indirectly a data connection between the user terminal and the server and the security-relevant circuit transmits a unique identifier of the user terminal for the identification thereof to the server, even if a power supply of the electronic user terminal or functionally-relevant circuits of the user terminal fail, and wherein, after receipt of a confirmation to render the user terminal unusable, the server causes the security-relevant circuit of the user terminal to effect the irreversible manipulation of at least one component of the user terminal by sending a control command to the security-relevant circuit to put the user terminal into an irreparable state.

2. The system as claimed in claim 1, wherein the server is a server of a device manufacturer or a server of a device retailer which is connected to the user terminal via an external interface of the user terminal.

3. The system as claimed in claim 1, wherein the unique identifier of the user terminal is a device code which is stored in a memory of the user terminal and is derived from a serial number of the user terminal.

4. The system as claimed in claim 1, wherein the electronic user terminal is automatically put into the irreparable state only after a user has transmitted a confirmation in this regard to the server.

5. The system as claimed in claim 1, wherein the irreversible manipulation includes the destruction of an electronic component, in particular a fuse, or the overwriting of stored configuration data of the user terminal.

6. The system as claimed in claim 1, wherein, with respect to the at least partially defective user terminal, after establishing a connection between the affected user terminal and the server, a dataset is transmitted to the server for performing data synchronisation in relation to the presence of a warranty, wherein the dataset transmitted to the server comprises:
    user-specific data of the user,
    device-specific data of the user terminal, in particular the unique identifier of the user terminal,
    error-specific data indicating the technical malfunctions which have occurred on the user terminal and the circumstances surrounding the malfunctions, and
    sales-specific data indicating a purchasing process when the user bought the user terminal from a device retailer or the device manufacturer.

7. The system as claimed in claim 1, wherein sensors provided on the user terminal provide sensor data to the server indicating external impacts which have occurred on the user terminal, in particular undue mechanical force and ingress of moisture.

8. The system as claimed in claim 7, wherein the error-specific data contained in the dataset and the sensor data obtained by the sensors on the user terminal are evaluated by the server in order to establish whether these items of data are compatible with each other.

9. The system as claimed in claim 1, wherein the functionally-relevant circuits within the user terminal are diagnosed in relation to their functionality by the server and/or by the security-relevant circuit of the user terminal.

10. The system as claimed in claim 9, wherein the functionally-relevant circuits of the user terminal are diagnosed interactively with the user in that the user performs particular actions, on request, on the user terminal.

11. The system as claimed in claim 1, wherein the security relevant circuit is integrated in the user terminal itself or in a component connected to the user terminal, in particular a mains plug, an adapter or a connecting cable.

12. The system as claimed in claim 1, wherein the user manually actuates at least one button provided on the user terminal in order to confirm putting the user terminal into the irreparable state.

13. The system as claimed in claim 1, wherein the electronic user terminal is a portable user terminal which is connected to a computer via an interface, which computer is connected to the server via a network, in particular a data or telephone network.

14. The system as claimed in claim 1, wherein the security-relevant circuit of the user terminal, after the user terminal has been put into the irreparable state, transmits a corresponding acknowledgement to the server, wherein, after receipt of the acknowledgement, the server initiates the dispatching of a replacement user terminal to the user to replace the user terminal put into the irreparable state.

15. A method for handling an at least partially defective electronic user terminal comprising functionally-relevant circuits and at least one security-relevant circuit located within or connected to the electronic user terminal, wherein the security-relevant circuit is electronically connected to the electronic user terminal, wherein the electronic user terminal, after being successfully identified by a server, is automatically and irreversibly put into an irreparable state by way of an irreversible manipulation of at least one component of the user terminal, if a performed diagnosis of functionally-relevant circuits of the user terminal indicates that these functionally-relevant circuits are impaired in terms of their functionality or have failed, the electronic user terminal establishes directly or indirectly a data connection between the user terminal and the server and the security-relevant circuit transmits a unique identifier of the user terminal for the identification thereof to the server, even if a power supply of the electronic user terminal or functionally-relevant circuits of the user terminal fail, and wherein, after receipt of a confirmation to render the user terminal unusable, the server causes the security-relevant circuit of the user terminal to effect the irreversible manipulation of at least one component of the user terminal by sending a control command to the security-relevant circuit to put the user terminal into an irreparable state.

16. An electronic user terminal having functionally-relevant circuits and having at least one security-relevant circuit located within or connected to the electronic user terminal, wherein the security-relevant circuit is electronically connected to the electronic user terminal, wherein the electronic user terminal, after being successfully identified to a server is automatically put into an irreparable state by the server by way of an irreversible manipulation of at least one component of the user terminal, if a performed diagnosis of functionally-relevant circuits of the user terminal indicates that these functionally-relevant circuits are impaired in terms of their functionality or have failed, the electronic user terminal establishes directly or indirectly a data connection between the user terminal and the server and the security-relevant circuit transmits a unique identifier of the user terminal for the identification thereof to the server, even if a power supply of the electronic user terminal or functionally-relevant circuits of the user terminal fail, and wherein, after receipt of a confirmation to render the user terminal unusable, the server causes the security-relevant circuit of the user terminal to effect the irreversible manipulation of at least one component of the user terminal.

17. A server for handling an at least partially defective electronic user terminal, wherein after the electronic user terminal has established directly or indirectly a data connection between the user terminal and the server and after the user terminal has been successfully identified by the server by examining an identifier received from a security-relevant circuit of the user terminal via the established data connection, wherein the security-relevant circuit is electronically connected to the electronic user terminal, the server initiates the process of putting the electronic user terminal into an irreparable state by way of an irreversible manipulation of at least one component of the user terminal by sending a control command, if a performed diagnosis of functionally-relevant circuits of the user terminal indicates that these functionally-relevant circuits are impaired in terms of their functionality or have failed.

18. The system as claimed in claim 2, wherein the security-relevant circuit is supplied with power via the external interface or a separate battery.

19. The system as claimed in claim 5, wherein the security-relevant circuit draws the energy required to destroy the electric fuse from the outside via the external interface.

* * * * *